Patented June 4, 1940

2,203,302

UNITED STATES PATENT OFFICE 2,203,302

CONCRETE HARDENING COMPOSITION OF THE METAL SALT TYPE

Leo Liberthson, New York, N. Y., assignor to L. Sonneborn Sons, Inc., a corporation of Delaware No Drawing. Application December 24, 1937, Serial No. 181,682

5 Claims. (Cl. 134—78.5)

This invention relates to new and useful improvements in concrete hardening compositions of the metal salt type.

Concrete surfaces that are subject to traffic have a tendency to dust due to erosion and abrasion. In accordance with well known practices, such concrete surfaces are hardened and thereby rendered resistant to abrasion and dusting by subjecting them to the action of aqueous solutions of metal salts selected from the group consisting of water soluble metal fluosilicates, alkali silicates, alkali aluminates, and zinc, cupric, ferric, alumina and nickel sulphates and alums capable of reacting with the free lime and/or calcium carbonate to form insoluble substances deposited in the pores and voids of the concrete surfaces.

The application of such salts also has the effect of diminishing the porosity and rendering the surface substantially less permeable to and reactive with chemical solutions which normally tend to erode concrete as, for example, sea water and sodium sulphate solutions, and in general alkaline and acidic liquors.

The application of conventional concrete hardeners, such for example, as mentioned above, is, however, attended by certain disadvantages. Concrete surfaces vary greatly in porosity and density. Where the porosity is relatively low and density correspondingly high, due to the absence of voids, the aqueous solution of the concrete hardening composition penetrates with difficulty, if at all. Consequently, the major quantity of the solution applied will not penetrate into the pores of the concrete surface but will evaporate, thus leaving on the surface unreacted salts. Attempts have been made to overcome this difficulty by applying the hardening composition in a repetitious manner using a number of successive solutions of varying concentration beginning with the lowest dilution and ending with the solution of maximum concentration, for example, 10–25% of anhydrous salt.

A further disadvantage of the conventional concrete hardening compositions resides in the fact that the metal salts in their aqueous solution react immediately upon contact with the concrete surface, due to the free lime and calcium carbonate in the top layer of the surface, thus resulting in the deposition of reaction products at the surface which block the pores thereof, preventing the further penetration of hardening agent into the same. These surface deposited reaction products are difficult to remove and impart to the surfaces treated an unsightly appearance.

One object of the instant invention is a concrete hardening composition which will spread evenly and uniformly over and penetrate into a concrete surface regardless of the concentration of the aqueous solution of the composition as applied.

Another object of the invention is a concrete hardening composition with a deferred reaction, i. e., a composition which will not deposit a precipitate immediately upon contact with the outer concrete surface but will possess a retarded reactivity so that the treating liquid has already penetrated the surface layer before the deposition reaction is completed.

I have discovered that the aforementioned disadvantages attending the application of the conventional hardening compositions of the metal salt type may be substantially overcome while obtaining at the same time a retarded reactivity of the aqueous hardening solutions by lowering their surface tension to at least 45 dynes/cm. and preferably to at least 40 dynes/cm. at 80° F. This result may be achieved by adding to the aqueous solution of the conventional concrete hardeners of the metal salt type an organic surface tension depressant which is substantially water soluble and possessed of substantial permanent stability to strong electrolytes. Depressants of this type that I have found useful in accordance with my invention are, for instance, the water soluble sulphonic acids and sulphonates of hydrocarbons, possessing in open chain configuration not more than 18 and not less than 10 carbon atoms and carrying at least 1 sulphonic group in the open chain; these may be used either individually or in combination with one another.

I prefer, however, to use as the depressant a combination or mixture of water soluble and electrolyte stable sulphonic acids or sulphonates of hydrocarbons of not more than 18 and not less than 10 carbon atoms derived from the fuming sulphuric acid treatment of hydrocarbons. The most convenient source for this selected fraction of petroleum sulphonic acids or sulphonates that I may use in accordance with the preferred embodiment of my invention is furnished by the so-termed "green petroleum sulphonic acids" obtained in the acid refining of petroleum oil distillates with concentrated and preferably fuming sulphuric acid and isolated either as such or in the form of their salts in accordance with well known practices. These green petroleum sulphonic acids, preferably in the form of their salts, will yield the desired selected fraction of the afore-described character and nature when subjected to selective fractionation in accordance with a suitable conventional method such as the Spitz-Hoenig method. I prefer to use sodium, potassium, or ammonium salts of the sulphonic acids of the above-described characteristics and these will be designated in the claims generically as alkali metal sulphonates.

The amount of depressant necessary to reduce the surface tension of the solution of concrete hardening agent to the desired point is dependent upon the potency of the depressing agent. As a general rule, satisfactory results are obtained with additions of from 0.05 to 0.5% of the depressant. Additions of from 0.05 to 0.1% of the depressant to the aqueous solution of the concrete hardener are sufficient to accomplish a surface tension reduction of the solution to at least 45 dynes/cm., whereas additions of from 0.1 to 0.5% will, in most cases, lower the surface tension of the hardening solution to at least 40 dynes/cm.

Ordinarily the conventional concrete hardening compositions of the metal salt type are used in concentrations ranging between 10 and 25% of anhydrous salt in water. Though in general the salt concentration of these aqueous solutions does not exceed 25%, yet particular circumstances may require higher concentrations; but even in such cases it is rarely necessary to increase the amount of sulphonate added beyond 0.5% to accomplish a lowering of the surface tension to at least 45 dynes/cm.

When a 15 to 20% (anhydrous salt) aqueous magnesium fluosilicate solution, possessing a surface tension of 75.2 dynes/cm. at 80° F., is applied to a relatively dense concrete surface, very little penetration will be observed and the reaction is primarily between the solution and the surface. The surface pores become filled with the insoluble reaction products, thereby substantially checking further penetration of the hardening solution.

When pre-diluting the hardening solution of the above concentration with from 1 to 4 volumes of water, depending upon the degree of permeability of the concrete surface, and applying the same in steps while increasing the concentration after each step and allowing the concrete surface to dry after each application, the desired hardening result is eventually obtained after a comparatively long period of time and a great deal of repetitious treatment.

In contrast with the above, when aqueous solutions of magnesium fluosilicate of the concentration and surface tension set forth above are admixed with 0.05%, 0.1%, 0.2% and 0.5%, respectively, of the sodium salt of the selected fraction of green petroleum sulphonic acids, thereby lowering the surface tension of the aqueous solutions to 45.0, 37.0, 35.8 and 34.4 dynes/cm. at 80° F., respectively and applied to the same type of concrete surfaces referred to in the preceding paragraph, the absorption and penetration of the solution is rapid and the hardening treatment is successfully completed within a very short period of time and substantially without surface deposition of reaction products. This example of the application of my invention is furnished by way of illustration and is not to be construed as a limitation thereof.

In determining the relative efficiency of my novel hardening composition as compared with the conventional compositions of the metal salt types, I have found that, whereas the application of one cc. of any one of the solutions referred to in the preceding paragraph, and particularly the solutions containing at least 0.1% depressant, require but 20 to 40 seconds for complete penetration into a relatively dense concrete surface. The same amount of the conventional composition applied on the same surface requires as long as five minutes and in the case of extremely dense surfaces, no penetration at all is effected with the conventional solution which simply evaporates on the outer surface leaving a crystalline deposit of the original salt.

In all cases the addition of the depressant may be accomplished in any suitable manner. The same may be added as such, i. e., in dry state, to the aqueous solution of the hardening agent or alternatively may be added thereto in the form of an aqueous solution.

Where it is desired to alter or modify the appearance of the concrete surface so as to obtain variations in color, I may use solutions of cupric, ferric and nickel salts in conjunction with the hardening composition as modified in accordance with my invention, and may also use either in whole or in part salts of these metals which have a hardening action on concrete, i. e., which are concrete hardeners.

The expression "sulphonic acids" as employed in the claims connotes the sulphonic acids generically in both free and combined chemical state.

The foregoing description is for purposes of illustration and not of limitation, and is not to be limited except by the appended claims in which I have endeavored to claim broadly all inherent novelty.

I claim:

1. An aqueous concrete hardening solution comprising an aqueous solution of at least one water soluble metal salt concrete hardener and sulphonic acids of hydrocarbons possessing in open chain configuration not more than 18 and not less than 10 carbon atoms, said acids being present in amount and potency sufficient to reduce the normal surface tension of said solution to at least 45 dynes/cm. at 80° F.

2. An aqueous concrete hardening solution comprising an aqueous solution of at least one water soluble metal salt concrete hardener and green petroleum sulphonic acids of hydrocarbons possessing in open chain configuration not more than 18 and not less than 10 carbon atoms, said acids being present in amount and potency sufficient to reduce the normal surface tension of said solution to at least 45 dynes/cm. at 80° F.

3. An aqueous concrete hardening solution comprising an aqueous solution of at least one water soluble metal salt concrete hardener and an alkali metal salt of sulphonic acids of hydrocarbons possessing in open chain configuration not more than 18 and not less than 10 carbon atoms, said salt being present in amount and potency sufficient to reduce the normal surface tension of said solution to at least 45 dynes/cm. at 80° F.

4. An aqueous concrete hardening solution comprising an aqueous solution of at least one water soluble metal salt concrete hardener and an alkali metal salt of green petroleum sulphonic acids of hyrdocarbons possessing in open chain configuration not more than 18 and not less than 10 carbon atoms, said salt being present in amount and potency sufficient to reduce the normal surface tension to at least 45 dynes/cm. at 80° F.

5. An aqueous concrete hardening solution comprising an aqueous solution of at least one concrete hardener of the water soluble metal fluosilicate type and an alkali metal salt of green petroleum sulphonic acids of hydrocarbons possessing in open chain configuration not more than 18 and not less than 10 carbon atoms, said salt being present in amount and potency sufficient to reduce the normal surface tension to at least 45 dynes/cm. at 80° F.

LEO LIBERTHSON.